Feb. 7, 1967 C. E. CARTER ETAL 3,303,247
EXTRUSION HEAD FOR PLASTIC TUBING
Filed Sept. 21, 1964 2 Sheets-Sheet 1
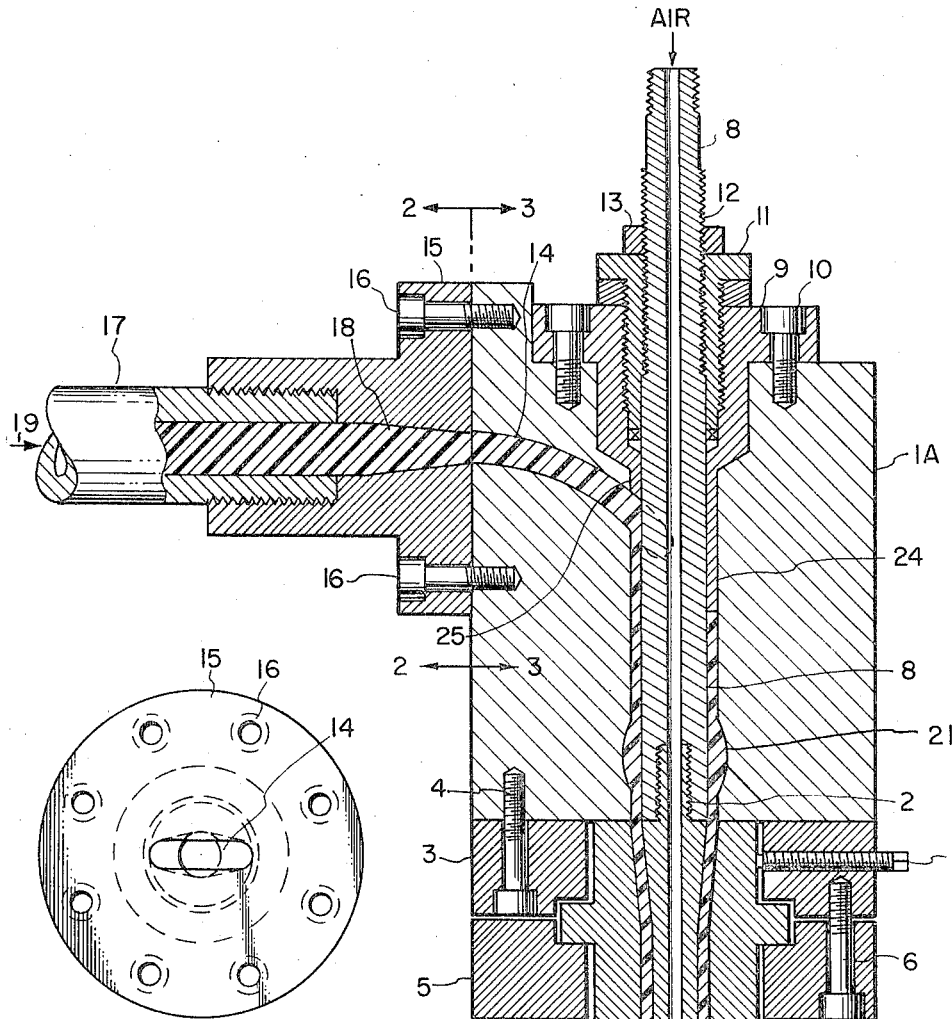
FIG. 1
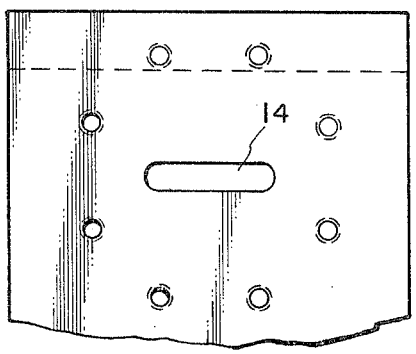
FIG. 2
FIG. 3
INVENTORS
CHARLES E. CARTER
STANLEY C. WELLS, JR.
BY
Robert Elmer Shorter
ATTORNEY Feb. 7, 1967  C. E. CARTER ETAL  3,303,247
EXTRUSION HEAD FOR PLASTIC TUBING
Filed Sept. 21, 1964   2 Sheets-Sheet 2

INVENTORS
CHARLES E. CARTER
STANLEY C. WELLS, JR.
BY Robert Ameshot
ATTORNEY

United States Patent Office 3,303,247
Patented Feb. 7, 1967

3,303,247
EXTRUSION HEAD FOR PLASTIC TUBING
Charles E. Carter, Easthampton, and Stanley C. Wells, Jr., Southampton, Mass., assignors to United Plastic Corporation, Easthampton, Mass., a corporation of Massachusetts
Filed Sept. 21, 1964, Ser. No. 397,900
10 Claims. (Cl. 264—95)

This invention relates to an improved extrusion apparatus and method for extruding tubing of plastic and more particularly of plastic having a short extrusion range.

In the past the extrusion of tubing of plastics of long extrusion range, such as polyethylene has been effected in an apparatus in which the polyethylene, melted to a suitable viscosity, is introduced in the form of a round rod into the side of an extrusion head which is provided with a hollow mandrel and an extrusion die forming with the mandrel an accurately dimensioned and positioned annulus. The plastic is forced in under pressure and is extruded in the form of a tube. Since the plastic is not sufficiently hardened to be completely self-supporting the end of the tube is sealed tight at the start of any extrusion and a small pressure of air is maintained through the hollow bore of the mandrel. This distends the tube slightly, supporting it and it is then set by cooling with air or by other well known means. Take-up rolls pull the tube out and may, if desired, stretch it, determining the tube wall thickness. Different extrusion dies may be bolted on to the head for producing tubing of different sizes. No problem is encountered with a plastic such as polyethylene which is sufficiently flowable so that it forms a uniform tube which is perfectly clear. The method and the apparatus have been used on a very large scale and constitute one of the standard methods of producing tubing from suitable plastics, such as polyethylene.

When it is attempted to extrude tubes of polyurethane by the method and the apparatus described above for polyethylene, problems are encountered. Polyurethane does not have the long extrusion range of polyethylene and has to be introduced at more perfectly controlled viscosities. As a result when the solid rod of polyurethane is forced to turn and fill the annular space between the mandrel and the extrusion head, and further down the extrusion die the results are unsatisfactory. At the point of maximum change of direction optical and dimensional imperfections in the tubing result. These imperfections do not necessarily affect the strength of the tube but they do produce a seam because the zone of imperfections is not perfectly homogenous and hence not transparent. The tubes, although they may be mechanically of suitable strength, do not look well and in order to avoid this drawback it is customary to pigment the polyurethane or otherwise color it so that the seam is masked. Where an opaque tube is acceptable polyurethane tubing produced with pigmentation or coloring has been sold and is a practical, though not so perfect product. However, for many purposes it is desirable to have a perfectly uniform, clear, transparent tubing of maximum strength and this has hitherto not been practical at least on a reliably reproducible schedule. It is with the problem of producing uniform, transparent tubes of polyurethane or similar type of plastic that the present invention deals.

Essentially the present invention utilizes an extrusion die mandrel and air pressure for supporting the tube until it is hardened in exactly the same manner as in the extrusion method and apparatus used for polyethylene tubing. However, instead of introducing a solid rod of polyurethane into the extrusion head the polyurethane introduced is formed into a somewhat flattened ribbon. Now when the ribbon has to change direction in order to flow down through the annular space between the mandrel and the extrusion head and further down the extrusion die, the curvature, which is coaxial with the thin dimension of the ribbon, does not produce imperfections which show up as a seam. On the contrary, perfectly clear polyurethane tubing can be extruded continuously and reliably without any off-grade material.

In order to produce the tubing by the method described above, a different form of extrusion head and channel for the introduction of the polyurethane is required and this combination constitutes the apparatus phase of the present invention. The use of a removable die, while desirable, and provided in the present invention, does not constitute the distinction from the prior art. These dies may be of substantially the same design as used with polyethylene type materials for the production of tubing. Preferably they are removable in order to accommodate tubing of different sizes. As far as the main part of the head is concerned, the present invention eliminates production of an undesirable seam in the finished tubing but the easier curving of the ribbon shaped polyurethane coming in also minimizes pressure drop and turbulence in the head. This is however, of less major importance than the production of uniform, transparent tubing which is the main advantage of the present invention. The fact that no disadvantages result, and no compromises are needed is an added advantage of the present invention.

The exact means by which the extrusion head is made forms no part of the present invention in its broader aspect. There will be described however, a method of forming the extrusion head and design therefor which is advantageous and so in a more specific aspect of the invention this is an additional feature. The preferred method involves a split block head which is then bolted or otherwise fastened together. However, any other method of producing the cavities necessary to introduce a ribbon may be used, for example by an insert plug, and so in the broader aspect the present invention includes an extrusion head having the desired configuration regardless of the method by which the head is made.

The invention will be described in greater detail in conjunction with the drawings in which:

FIG. 1 is a vertical section through extrusion head die and material supply;

FIG. 2 is an elevation of the material supply element along the line 2—2 of FIG. 1 looking toward the left;

FIG. 3 is an elevation of a portion of the extrusion head at the point where the material supply is attached and is situated along the line 3—3 of FIG. 1 looking toward the right.

Figure 4:
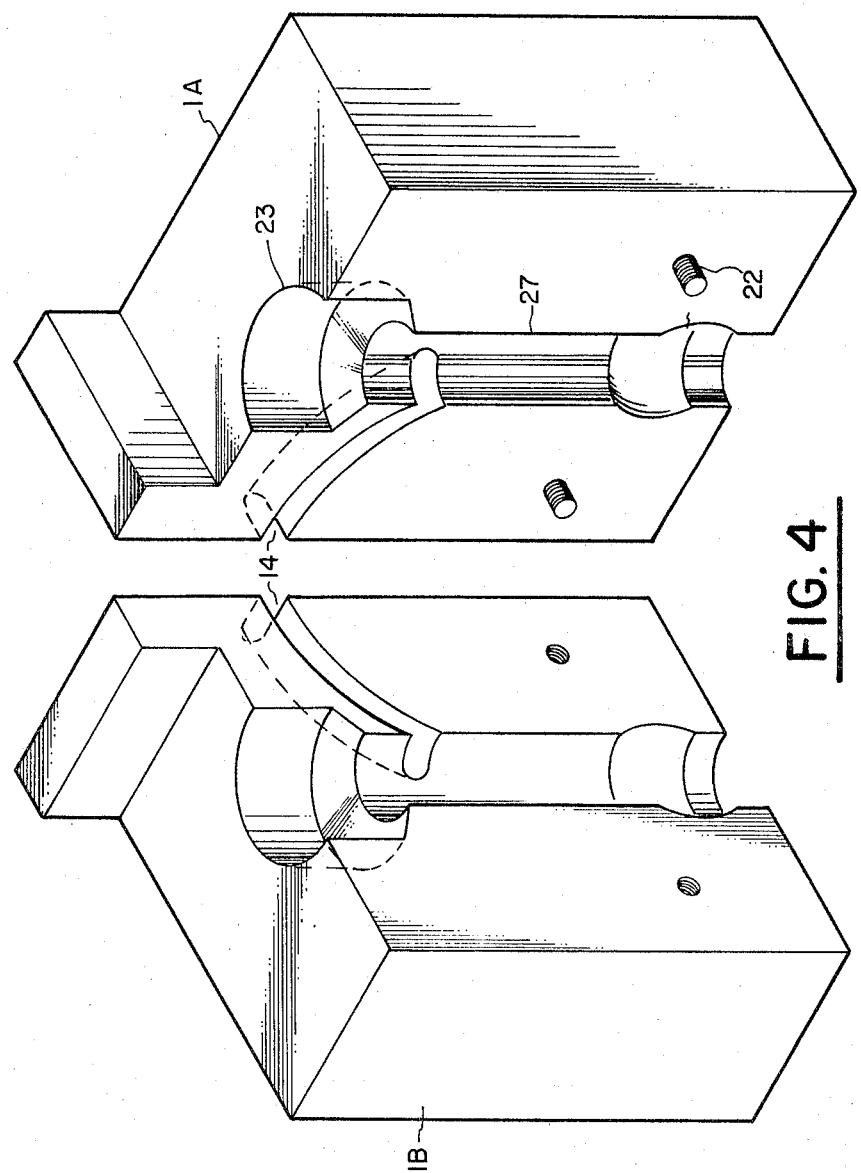
FIG. 4 is an isometric view of the two blocks of which the extrusion head is formed the said blocks being shown separated.

The extrusion head in FIG. 1 has a main casting which is shown as 1A because in the view it is this block. The other block, 1B, is shown in FIG. 4 but does not appear in FIG. 1.

A mandrel tip 2 is screwed into the hollow mandrel 8 and a die 26 is held in two rings 3 and 5. The former is bolted to the extrusion head by bolts 4 and the latter is bolted to the ring 3 by bolt 6. An adjusting set screw 7 serves to position the die accurately with its central part, which is the mandrel tip 2, screwed to the mandrel 8 as described above.

The mandrel 8 is hollow, the hollow center communicating with a source of air under slight pressure which is not shown and is indicated only by arrow and legend on the drawing. In the two blocks 1A and 1B, which form the extrusion head, there is a large bore at the top 23 which takes a hollow transition plug 9 having a beveled sealing seat, fastened to the extrusion head by bolts 10. The bottom portion of this element extends farther down on the right hand side of FIG. 1 as shown at 24 and not so far at 25. The shapes of the bottom edges being segments of smooth spirals. Inside of the plug 9 is a hollow packing gland 11 into which the mandrel 8 is screwed by threads 12 and held in position by a lock nut 13.

On the side of the extrusion head there is mounted an element 15 into which is screwed a conduit 17 from a source of polyurethane 19 under pressure. This source is not shown and is indicated only by an arrow on the drawing as the feed of the polyurethane is by any conventional means. The element 15 is bolted onto the extrusion head 1A and 1B by bolts 16 and is provided with a tapering hollow center 18 which gradually transforms the circular rod of plastic coming through the tube 17 into a ribbon form. The final ribbon shape is shown at 14 in FIGS. 2, 3 and 4. It enters into the blocks 1A and 1B of extrusion head and is curved down as is shown in FIGS. 1 and 4, the ribbon being turned to fill the annular space by the spiral shape of the lower portions 24 and 25 of the transition plug 9. After the ribbon has turned and is now in the form of an annulus of polyurethane between the mandrel 8 and the extrusion head it passes down through a relief or surge chamber 21 in the form of a groove in the extrusion head perpendicular to main axis of head. This further assures that there are no strains or imperfections in the annulus of plastic moving on down through the tapered annular channel of the extrusion die 2. A tube is extruded and at the start the end is shown sealed at 20 in FIG. 1. This sealing and the air pressure through the hollow in the mandrel 8 is used in the same manner as in the standard polyethylene tube manufacture and, while necessary to the present invention, is not the portion distinguishing from the polyethylene extrusion head.

Turning to FIG. 4 it will be seen that the two blocks permit the machining of the ribbon shaping channels 14 and then when clamped together the bores 23 and 25 are made in the normal manner. The two blocks are bolted together by bolts 22.

In operation polyurethane, or a material having similar characteristics, is continuously introduced by a conventional extruding mechanism and is transformed into a ribbon in the portion 18 of the element 15. This ribbon is gradually curved by the spiral surfaces of the portions 24 and 25 of the transition plug 9 and the curving is so gradual that no imperfections result which would otherwise produce a seam. Any strains introduced are equalized in the chamber 21 and uniform, clear polyurethane tubing is extruded. The tubing is normally extruded into a water bath as this is the standard way of hardening polyurethane and is carried on by rollers which may stretch the tubing. As these elements are standard and do not differ from the method used before, they are not shown.

In the specific description of the drawings an extrusion head has been described for extruding hollow tubing. This is the most important single field for the present invention but it is not the only field in which the invention has advantages. It is possible to use a mandrel tip which is solid and which is normally referred to as a blind tip. This will result in the annular plastic material coalescing before it passes through the end of the extrusion die and so will result in extruding a solid shape which may be circular, that is to say a rod, or it may have other shapes such as rectangular, fluted and the like. The particular shape, of course, is determined by the form of the opening in the extrusion die. When a solid form is to be extruded the mandrel need not be hollow. However, in many cases it is desirable to be able to change over from the extrusion of hollow tubing to the extrusion of a solid shape at will. In such a case the hollow mandrel can remain, as a blind tip, when screwed in, will block off the hollow center of the mandrel. Such a construction which uses a single head with interchangeable dies and mandrel tips has the advantage of greater flexibility while retaining all of the advantages of the invention in producing uniform homogenous extrusions.

I claim:
1. In an extrusion head for the extrusion of plastic tubing which is provided with a mandrel, a die, means for introducing plastic into the annular space between the mandrel and the extrusion head and die, the improvement which comprises;
   (a) means for introducing the material to be extruded in the form of tubing in the shape of a ribbon, means in the extrusion head to divide and turn the ribbon into the annular space between mandrel and head, said means being positioned so that the turn of the ribbon is about the short axis of the ribbon which is along the long dimension of a cross section thereof, whereby the plastic is introduced into the annular space without forming nonuniformities on one side of the tube.
2. An extrusion head according to claim 1 for the extrusion of plastic tubing in which the mandrel is hollow throughout its length and means are provided for introducing gas under pressure into the hollow mandrel.
3. An extrusion head and die according to claim 1 in which the annular space between mandrel and extrusion head is expanded into a strain relief chamber between the introduction point of the plastic ribbon and the extrusion die.
4. An extrusion head and die according to claim 1 in which a transition plug is provided around the mandrel above the point of introduction of plastic, filling the annular space between mandrel and extrusion head and provided with spirally inclined faces against which the material is forced.
5. An extrusion head according to claim 1 in which the head is formed of two blocks with mating surfaces bisecting the longitudinal dimension of the mandrel and means are provided to fasten the two blocks together to form an integral extrusion head.
6. A process of extruding material of short extruding temperature range through an extruding head and die with a mandrel, comprising in combination, introducing the material to be extruded into the side of the extrusion head in the form of a ribbon, turning it into the head about an axis parallel to the long dimension of the ribbon cross section into the annular space between the mandrel and the extrusion head and forming it into a tubular shape around the mandrel temporarily lowering pressure on the tubing and extruding it in tubular form.
7. A process according to claim 6 in which the mandrel is hollow and gas under pressure is introduced into the hollow mandrel.
8. A process according to claim 7 in which the extrudate is an elastomer and the extruded tubing is introduced into a cooling bath.
9. A process according to claim 8 in which the elastomer is a polyurethane elastomer.
10. A process according to claim 6 in which the material is a polyurethane elastomer.

References Cited by the Examiner
UNITED STATES PATENTS

| | | | |
|---|---|---|---|
| 2,560,778 | 7/1951 | Richardson et al. | 18—14 X |
| 2,794,213 | 6/1957 | Davis | 18—13 |
| 3,029,474 | 4/1962 | Voigt et al. | 18—14 X |

FOREIGN PATENTS

| | | |
|---|---|---|
| 801,934 | 9/1958 | Great Britain. |

WILLIAM J. STEPHENSON, *Primary Examiner.*